Dec. 31, 1940.    F. C. BEST    2,226,656
MOTOR VEHICLE
Filed July 1, 1936    3 Sheets-Sheet 1
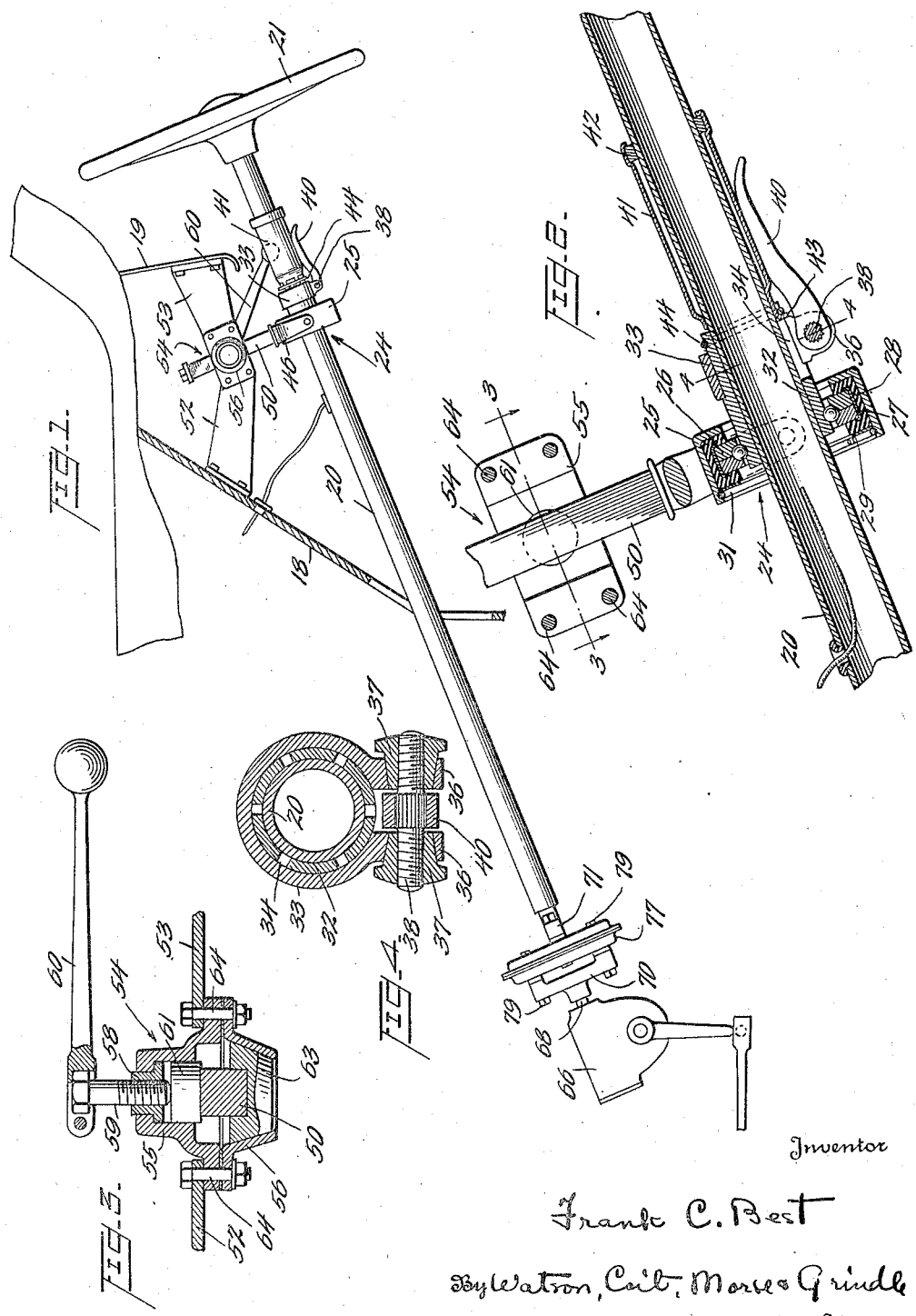
Inventor
Frank C. Best
By Watson, Cait, Morse & Grindle
Attorneys

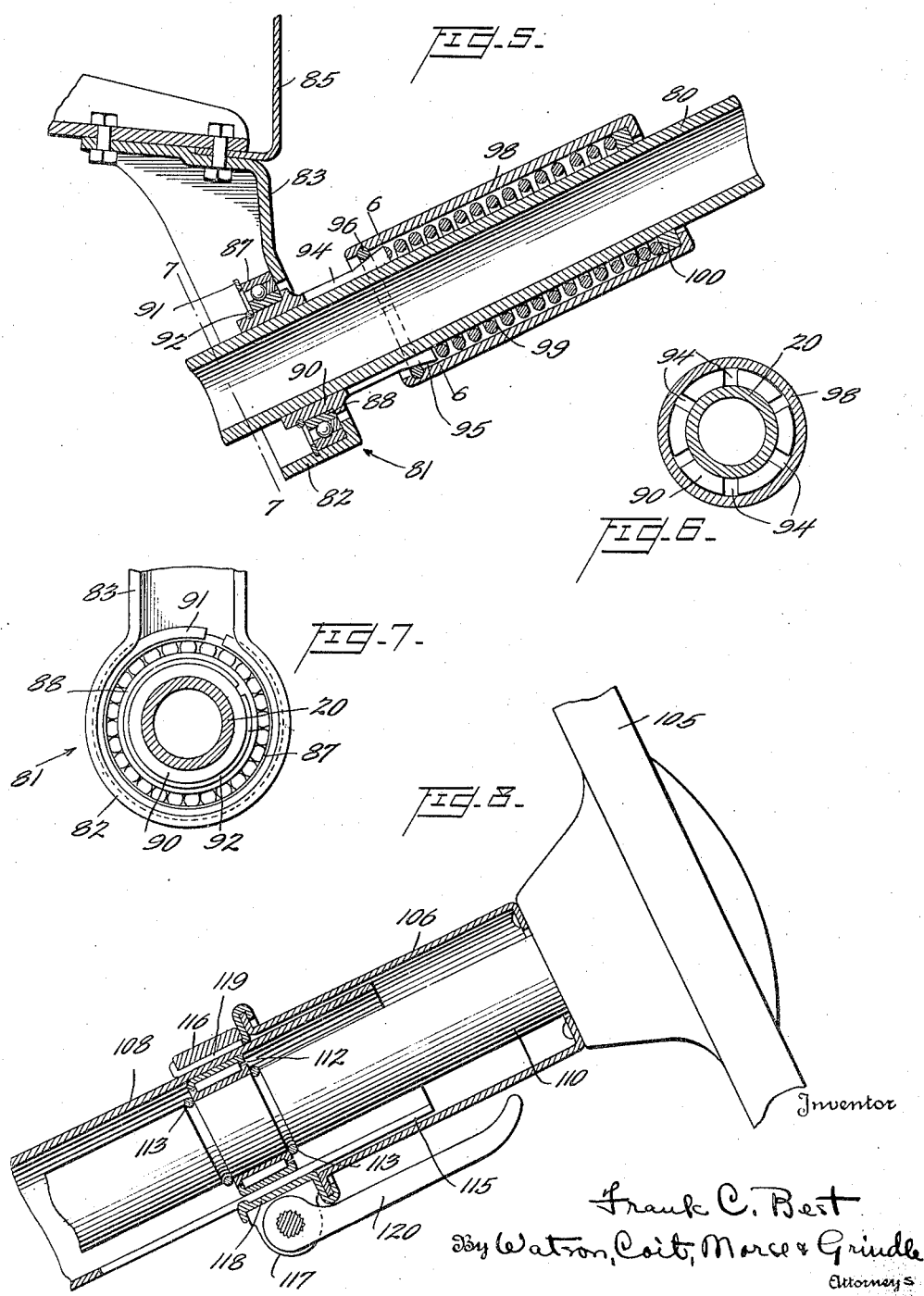

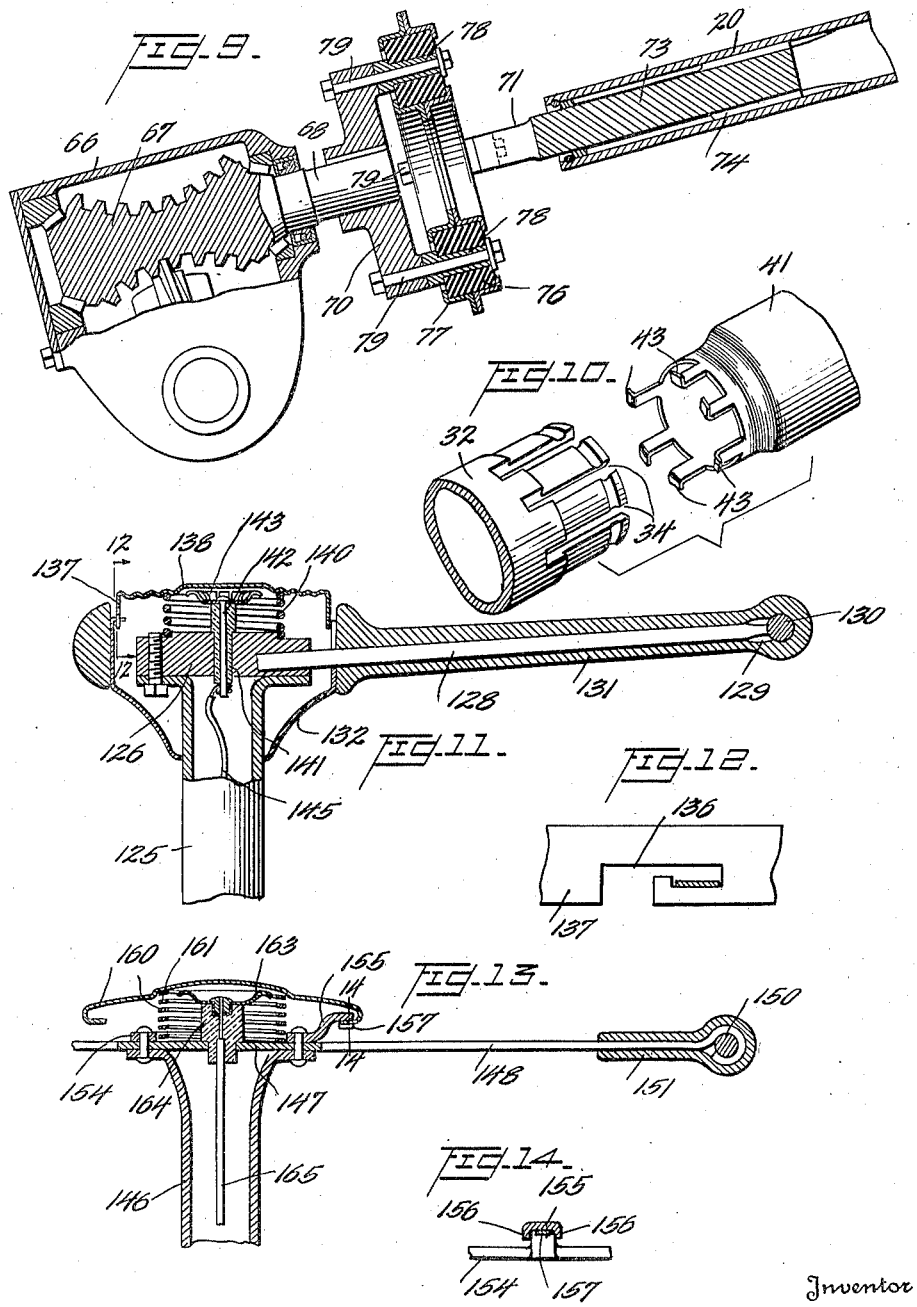

Patented Dec. 31, 1940

2,226,656

UNITED STATES PATENT OFFICE 2,226,656

MOTOR VEHICLE

Frank C. Best, Detroit, Mich., assignor to Packard Motor Car Company, Detroit, Mich., a corporation of Michigan Application July 1, 1936, Serial No. 88,478

15 Claims. (Cl. 74—493)

This invention relates to steering mechanism and associated apparatus for motor vehicles. It is the principal object of the invention to provide a steering shaft and hand wheel which can be easily and quickly adjusted to various positions to afford proper accommodation to different drivers or to different positions of adjustment of the driver's seat.

In the preferred embodiment of the invention the hand wheel may be displaced in the direction of the length of the steering shaft and may also be moved upwardly and downwardly, a wide range of hand wheel positions being readily available to the driver, the adjustment being effected from the driver's seat and without the use of tools. It is a feature of the invention that the supporting and connecting structures associated with the hand wheel not only permit instant adjustment and reliable operation of the latter, but also contribute materially to the reduction of vibrations normally transmitted to the hand wheel from other parts of the vehicle, and thus result in great improved comfort and safety in operation of the vehicle.

Further objects and features of the invention will be apparent from the following description taken in connection with the accompanying drawings, in which Figure 1 is a side elevation of steering apparatus and supporting means therefor embodying the principles of the invention;

Figure 2 is a vertical sectional view of a portion of the structure shown in Figure 1;

Figure 3 is a sectional view taken substantially on the line 3—3 of Figure 2;

Figure 4 is a sectional view on the line 4—4 of Figure 2;

Figure 5 is a fragmentary vertical sectional view of a steering column support illustrating a modified construction;

Figure 6 is a section on the line 6—6 of Figure 5;

Figure 7 is a section on the line 7—7 of Figure 5;

Figure 8 is a vertical sectional view illustrating a further modified construction;

Figure 9 is a vertical section taken at the lower end of the steering shaft of Figure 1;

Figure 10 is an exploded view showing two of the elements illustrated in Figure 2;

Figure 11 is a sectional view on the axis of the steering shaft illustrating the connections to the steering wheel and one form of horn button associated therewith;

Figure 12 is a partial section on the line 12—12 of Figure 11;

Figure 13 is a sectional view corresponding to Figure 11 but illustrating a modified form of the device; and Figure 14 is a fragmentary sectional view on the line 14—14 of Figure 13.

In order to facilitate an understanding of the principles of the invention reference is made to the several embodiments thereof illustrated in the accompanying drawings and specific language is employed. It will nevertheless be appreciated that no limitation of the scope of the invention is thereby intended, various alterations and rearrangements of the detailed structure being contemplated such as would ordinarily occur to one skilled in the art to which the invention relates.

Dealing first with the form of the invention shown in Figures 1 to 4 inclusive, 9, and 10, it will be observed that a portion of the interior of a motor vehicle body is shown, including the usual dash 18 and the instrument board 19. A steering shaft 20 at the upper end of which is mounted a steering hand wheel 21 is supported near its upper end on one of the body members, preferably on both the dash and the instrument board, the nature of the support being such as to permit angular displacement of the steering shaft as well as longitudinal displacement of the shaft and hand wheel, so that a large variety of positions may be assumed by the latter. It is common practice to support the steering shaft in a housing or steering tube, in which event suitable bearings are provided between the housing and shaft, the housing thus constituting a bearing means in which the shaft is mounted. In the preferred embodiment of the instant invention as illustrated in the drawings, the housing is omitted, and the supporting bearing for the shaft is directly associated with the body mounting means. It will nevertheless be appreciated that the arrangement shown in the drawings is equally applicable to other conventional types of steering column.

The supporting bearing for the shaft is indicated generally at 24 and comprises an outer casing 25 in which is assembled a divided outer bearing race 26 and a retainer 27 holding the elements of the race together. The race is preferably seated in a block of rubber or other deformable material 28 which is in turn received within the casing 25, being retained against displacement therein by means of an annular washer 29 and a retaining ring 31. The inner race of the bearing 24 comprises a sleeve 32 which surrounds the steering shaft 20 and is slidable thereon. Adjacent one end the sleeve 32 is provided with a plurality of longitudinally extending slots 34, these slots rendering the walls of the sleeve radially flexible so that the sleeve may be securely clamped in position on the steering shaft. The clamping means may be constructed as shown more particularly in Figures 2 and 4 to include a clamping band 33 having ears 36, these ears having oppositely tapering apertures for the reception of correspondingly tapered plugs 37, the latter having threaded connections of opposite hand with a bolt 38 which may be rotated by means of a manually operable lever 40 secured to the bolt intermediate the ears 36. It will be observed that when the lever 40 occupies the position in which it is shown in Figure 2, the band 33 will be tightened to cause the slotted end of the sleeve 32 to frictionally and securely grip the steering shaft 20, to prevent unintentional endwise displacement of the latter. Since this gripping of the shaft by the sleeve may mar the finish of the shaft, it is desirable to provide a shaft guard 41 in the form of a sleeve surrounding the shaft and carrying at its upper end an annulus 42 of rubber or the like which engages the associated portion to the shaft to exclude moisture and prevent rusting thereof. The lower end of the guard 41 is provided with a plurality of outwardly directed tongues 43, each of which is received within one of the slots 34 in the sleeve 32, being retained in position therein by means of a snap ring 44 surrounding the sleeve and engaging the tongues 43. The mode of assembly of this guard with the sleeve 32 will be more readily understood from an inspection of Figure 10 of the drawings illustrating the cooperating details of the guard and sleeve.

The structure thus far described may be supported in the vehicle body by mounting the casing 25 directly and rigidly on an adjacent body member or within the conventional rigidly mounted steering shaft housing, in which event it will be appreciated that the steering shaft 20 may be adjusted endwise by releasing the lever 40 and displacing the shaft and hand wheel in one direction or the other to a desired position. However, it is preferred to combine this longitudinal adjustment of the shaft with an angular adjustment therefor, and the casing 25 is shown as pivotally mounted in a yoke 46 which is in turn secured to or formed integrally with a shaft 50 which may be non-circular in cross-section and is illustrated as rectangular. Brackets 52 and 53 are secured to the dash and instrument board respectively and serve as a support for a housing indicated generally at 54 through which the shaft 50 extends, this housing being formed in two parts 55 and 56. The part 55 of the housing receives a bushing 58 having threaded engagement with a bolt 59, to the outer end of which is clamped an operating lever 60. At its inner end the bolt 59 engages a thrust block 61 which is slidably mounted in the part 55 of the housing, this thrust block in turn engaging one side of the shaft 50. The other side of the shaft 50 is received in a rectangular groove formed in a generally conical element 63, the latter being in turn received within the part 56 of the housing which is likewise of generally conical shape and is secured to the part 55 of the housing and to the brackets 52 and 53 by means of bolts 64.

It will be observed that when the lever 60 is rotated to withdraw the bolt 59 and release the pressure applied to the shaft 50 by the thrust block 61, the shaft 50 may be raised and lowered to effect corresponding raising or lowering of the upper end of the steering shaft 20, thereby altering the angular disposition of the shaft and the position assumed by the hand wheel 21. It will also be noted that by reason of the conical shape of the element 63, whereby the latter may be rotated in the part 56 of the housing 54, the shaft 50 may be swung angularly about the generally horizontal axis of the element 63 so as to permit endwise displacement of the bearing 24 and shaft 20 as a unit, wholly independently of any endwise adjustment of the shaft 20 within the bearing 24. It may be desirable, however, to combine the two types of endwise adjustment herein illustrated to increase the range of displacement of the hand wheel, although the separate use of either the adjustable mounting of the shaft 50 or the adjustable clamping connection of the supporting bearing 24 on the shaft 20 is contemplated.

The angular and endwise adjustment of the steering shaft 20 requires some alteration of the conventional connection between this shaft and the usual steering gear at the lower end of the steering column. The preferred form of connection is shown in detail in Figure 9 in which the gear housing 66 containing the conventional worm gear 67 is secured in fixed position, and the worm gear shaft 68 is connected to the steering shaft 20 through a universal joint and an endwise displaceable coupling. The universal joint is preferably of the type employing rubber and comprises two elements 70 and 71, the element 70 being secured to the shaft and the element 71 being formed integrally with or secured to a shaft 73 which extends within the steering shaft 20 and is provided with a splined connection therewith as indicated at 74, whereby the shaft 73 and steering shaft 20 may be relatively and freely displaced in the direction of the steering shaft axis. The elements 70 and 71 are each formed to provide two arms, the arms of the elements 71 lying transversely of the arms of the elements 70 so as to form right angles therewith. An annulus 76 of rubber or other deformable imperfectly elastic material is supported in a two-part floating casing 77 and is provided at intervals of 90° with bushings 78 in which are received bolts 79 passing through the arms on the elements 70 and 71. It will be appreciated that as the steering shaft 20 assumes different angular positions, the rubber annulus 76 will yield to accommodate such displacement of the steering shaft. By reason of the fact that the rubber annulus is interposed between and serves to isolate the steering shaft 20 and the steering gears within the housing 66, transmission of vibrations and other disturbances to the steering shaft is materially reduced. Transmission of vibrations from the vehicle body to the steering shaft is furthermore effectively prevented by means of the block 28 of rubber, and steering comfort thereby decidedly improved.

Referring now to Figures 5 to 7, illustrating a modified form of construction, it will be observed that the steering shaft 80 is supported in an anti-friction bearing indicated generally at 81 and comprising an outer casing 82 which is extended to form a supporting bracket 83, the latter being secured to the instrument panel 85 and/or to the vehicle dash in any convenient manner. Seated within the casing 82 is an outer bearing race 87 and an inner race 88 is seated on a sleeve 90, the latter surrounding the steering shaft 80 and having a sliding fit thereon. Split retaining rings 91 and 92 received in annular grooves in the casing 82 and sleeve 90 respectively retain the races in position. The sleeve 90 is provided at one end with a plurality of longitudinally extending slots 94 and the diameter thereof is tapered axially adjacent the outer end of the slotted portion to provide a cam surface 95 with which is engaged a split ring 96, the latter being seated in one end of a manually operable sleeve 98. A coil spring 99 abuts at one end an annulus 100 of rubber or the like, the latter serving to space the upper end of the sleeve 98 from the steering shaft 80 and at its other end is engaged with the end of the slotted portion of the sleeve 90. The degree of compression of the spring 99 is sufficient to cause the slotted portion of the sleeve 90 to frictionally engage and grip the shaft 80, thus retaining the latter against endwise displacement in the bearing 81. If it is desired to release the steering shaft 80 for endwise adjustment to another position, the sleeve 98 is grasped in the hand and moved downwardly along the steering shaft, whereby the latter is immediately released and the hand wheel may then be positioned wherever needed.

Obviously the casing 82 in the form of the invention just described may be supported in the manner illustrated in Figures 1 to 4 inclusive so that the steering shaft may be angularly adjusted, the endwise adjustment of the shaft by means of the arrangement shown in Figure 5 augmenting such endwise adjustment as is permitted by the first described type of mounting.

Figure 8 illustrates still a further embodiment of the invention in which the steering hand wheel 105 is secured to a sleeve 106, the latter embracing the housing 108 for the steering shaft 110 on which the hand wheel is mounted. An antifriction roller bearing 112 is secured against displacement on the steering shaft by retaining rings 113 and engages the interior of the housing 108. The latter is provided adjacent its upper end with a plurality of longitudinally extending slots 115 so that it is free to flex radially and grip the outer race of the bearing 112. A clamping ring 116 having ears 117 thereon is confined between radial flanges on a sleeve 118, the latter being slidable on the housing 108 and being slotted as indicated at 119 to permit radial contraction thereof. The ears 117 are drawn together or expanded by means of a lever 120, the construction being preferably similar to that shown in Figure 4 of the drawings. The flange at one end of the sleeve 118 is turned over a flange at the lower end of the sleeve 106, there being sufficient clearance to permit free rotation of the latter.

As in the first described form of the invention, the lever 120 may be manipulated to release the clamping pressure applied by the ring 116, and the hand wheel 105, the steering shaft 110 and the bearing 112 carried thereby may be displaced endwise of the shaft and again clamped in the desired position on the housing 108 by the lever 120. It will be understood that the housing 108 in this form of the invention is suitably supported on a convenient body member of the vehicle and if desired this support may be of the swinging type shown in Figures 1 to 4 inclusive so that angular as well as endwise adjustment of the steering hand wheel is possible.

Figures 11 and 13 illustrate steering hand wheels and associated mechanism for operating a vehicle horn. In the construction shown in Figure 11 the upper end of the steering column 125 terminates in a radially directed flange to which is secured a hub member 126, the latter being provided with generally radial apertures in which are received spokes 128 having a press fit in the apertures. The outer ends of the spokes are welded as at 129 to a rim ring 130 of sufficient mass to minimize the disturbance caused by such minor vibrations as are not effectively damped by the method of mounting and connecting the steering shaft hereinbefore described. The spokes and rim are preferably covered by suitable material 131 such as rubber or hardened plastic composition.

A hub cover 132, the upper end of which is received with a press fit within the rubber covering for the spokes, is provided at its upper end with a plurality of inwardly directed lugs, these lugs fitting within bayonet slots 136 formed in the depending flange 137 of a horn button 138, as shown more particularly in Figure 12. A coil spring 140 is interposed between the hub member 126 and the horn button 138 to urge the latter outwardly. Seated within a centrally disposed aperture in the hub member 126 is an insulating bushing 141 through which extends a conducting pin 142 which serves to secure an electrical contact member 143 on the upper end of the bushing 141 and to afford an electrical connection between this contact member and the usual horn cable 145. When the horn button is depressed, the cable 145 is grounded through the contact member 143 and the horn circuit thus completed. It will be appreciated that this construction is extremely simple, readily assembled, and permits the performance of double functions by several of the elements, whereby the total number of elements employed may be materially reduced.

In the modified arrangement shown in Figure 13 the steering shaft 146 is provided at its upper end with a generally radially directed flange to which are secured the inner ends 147 of a plurality of spokes 148, these inner ends of the spokes being enlarged to provide a substantially continuous annulus constituting the hub of the steering hand wheel. At its outer end each spoke 148 is bent around a rim ring 150. The spokes are preferably of spring steel or the like so as to afford considerable flexibility, and the mass of the rim ring 150 is sufficient to permit the absorption in the flexible spokes of vibrations transmitted through the hand wheel hub, particularly since vibrations of major amplitude are damped in the rubber mounting and rubber universal joint connection associated with the steering shaft as shown in the previously described figures. In order that the wheel spokes may have maximum flexibility it is preferred to cover only the outer portion of the spokes and the rim with rubber or other suitable hand wheel covering composition 151.

Secured to the hub 147 of the hand wheel is an annular element 154, having outwardly directed tongues 155 disposed at intervals about the periphery of the hand wheel hub. Each tongue 155 is formed at its outer end to provide depending lips 156 between which are received tongues 157 formed at corresponding intervals on and about the periphery of the horn button 160, whereby the latter may be readily assembled and locked in position. A coil spring 161 urges the horn button outwardly and depression of the button causes the latter to engage a contact member 163 carried on an insulated bushing 164 and connected to the horn cable 165.

Having thus described the invention, what is claimed as new and desired to be secured by Letters Patent is:

1. In steering apparatus for motor vehicles, the combination with a steering shaft having an operating hand wheel thereon, of bearing means supporting said shaft for rotation, means acting between said shaft and bearing means for securing said shaft against endwise displacement with respect to said bearing means, said last named means being operable to release said shaft for endwise adjustment to alter the position of said hand wheel, a vehicle body member, and means affording a hinged conection between said body member and said bearing means for supporting the latter.

2. In steering apparatus for motor vehicles, the combination with a steering shaft having an operating hand wheel thereon, of bearing means supporting said shaft for rotation, means acting between said shaft and bearing means for securing said shaft against endwise displacement with respect to said bearing means, said last named means being operable to release said shaft for endwise adjustment to alter the position of said hand wheel, a vehicle body member, and means supporting said bearing means on said body member for bodily displacement to a plurality of positions in the generally vertical plane containing the steering shaft.

3. In a steering apparatus for motor vehicles, the combination with a steering shaft having an operating hand wheel thereon, of bearing means supporting said shaft for rotation, means securing said shaft against endwise displacement in said bearing means, said last named means being operable to release said shaft for endwise adjustment to alter the position of said hand wheel, a vehicle body member, and means supporting said bearing means on said body member for bodily displacement to a plurality of positions in the generally vertical plane containing the steering shaft, said last named means including a member pivotally connected to said body member and said bearing means on generally horizontal axes.

4. In steering apparatus for motor vehicles, the combination with a steering shaft having an operating hand wheel thereon, of bearing means supporting said shaft for rotation, means securing said shaft against endwise displacement in said bearing means, said last named means being operable to release said shaft for endwise adjustment to alter the position of said hand wheel, a vehicle body member, and means supporting said bearing means on said body member for bodily displacement to a plurality of positions in the generally vertical plane containing the steering shaft, said last named means including a member pivotally and slidably connected with said body member and pivotally connected to said bearing means, the axes of such pivotal connections being generally horizontal.

5. In steering apparatus for motor vehicles, the combination with a steering shaft having an operating hand wheel thereon, of bearing means supporting said shaft for rotation, a vehicle body member, and means supporting said bearing means on said body member for displacement with respect thereto, said last named means including a member pivotally connected to said bearing means and to said body member on generally horizontal axes, gearing operable by said shaft, and a connection between said gearing and shaft permitting free endwise displacement of the latter.

6. In steering apparatus for motor vehicles, the combination with a steering shaft having an operating hand wheel thereon, of bearing means supporting said shaft for rotation, a vehicle body member, and means supporting said bearing means on said body member for displacement with respect thereto, said last named means including a member pivotally connected to said bearing means and to said body member on generally horizontal axes, one of said pivotal connections being displaceable on the pivotally connected member to alter the effective length of the latter, gearing operable by said shaft, and a connection between said gearing and shaft permitting free endwise displacement of the latter.

7. In steering apparatus for motor vehicles, the combination with a steering shaft having an operating hand wheel thereon, of bearing means supporting said shaft for rotation, said bearing means including a sleeve mounted on said shaft, a bearing race carried by said sleeve, and means for releasably clamping said sleeve to said shaft to frictionally grip the latter against endwise displacement.

8. In steering apparatus for motor vehicles, the combination with a steering shaft having an operating hand wheel thereon, of bearing means supporting said shaft for rotation, said bearing means including a sleeve mounted on said shaft, a bearing race carried by said sleeve, and means for releasably clamping said sleeve to said shaft to frictionally grip the latter against endwise displacement, said last named means including a manually operable lever.

9. In steering apparatus for motor vehicles, the combination with a steering shaft having an operating hand wheel thereon, of bearing means supporting said shaft for rotation, said bearing means including a sleeve mounted on said shaft, a bearing race carried by said sleeve, and means for releasably clamping said sleeve to said shaft to frictionally grip the latter against endwise displacement, said last named means including a manually operable element displaceable to effect clamping or release of said sleeve, and yielding means tending to displace said element in a direction to effect clamping of said sleeve on said shaft.

10. In steering apparatus for motor vehicles, the combination with a steering shaft having an operating hand wheel thereon, of bearing means supporting said shaft for rotation, spring actuated friction gripping means for retaining said shaft against unintentional endwise displacement in said bearing means, and manually operable means for releasing said spring actuated gripping means to permit endwise adjustment of said shaft and wheel.

11. In steering apparatus for motor vehicles, the combination with a steering shaft having an operating hand wheel thereon, of mounting means supporting said shaft for rotation, said mounting means including a steering shaft housing, a bearing between said shaft and housing and displaceable in the latter, and means carried by said hand wheel for clamping said bearing in said housing against displacement.

12. In steering apparatus for motor vehicles, the combination with a steering shaft having an operating hand wheel thereon, of a relatively stationary mounting structure supporting said shaft for rotation; means acting between said shaft and said mounting structure for securing said shaft against endwise displacement in said mounting structure; said means being operable to release said shaft for endwise displacement in said mounting structure to alter the position of said hand wheel; said means comprising the following: a split or kerfed cylindrical part forming a portion of said mounting structure and surrounding said shaft, binding means surrounding said element, and means for tensioning said binding means to clamp said element frictionally about said shaft so as to prevent said endwise displacement, and for releasing said tension.

13. In steering apparatus for motor vehicles, the combination with a steering shaft having an operating hand wheel thereon, of a relatively stationary mounting structure supporting said shaft for rotation; means acting between said shaft and said mounting structure for securing said shaft against endwise displacement in said mounting structure; said means being operable to release said shaft for endwise displacement in said mounting structure to alter the position of said hand wheel; said means comprising the following: a split or kerfed cylindrical part forming a portion of said mounting structure and surrounding said shaft, binding means surrounding said element, and means for tensioning said binding means to clamp said element frictionally about said shaft so as to prevent said endwise displacement, and for releasing said tension; gearing operable by said shaft; and a splined connection between the gearing and the lower or forward end of the shaft remote from the hand wheel.

14. In steering apparatus for motor vehicles, the combination with a steering shaft having an operating hand wheel thereon, of bearing means supporting said shaft for rotation, means securing said shaft against endwise displacement in said bearing means, said last named means being operable to release said shaft for endwise adjustment to alter the position of said hand wheel, a vehicle body member, and means supporting said bearing means on said body member for bodily displacement to a plurality of positions in the generally vertical plane containing the steering shaft, said last named means including a member pivotally and slidably connected with said body member and pivotally connected to said bearing means, and means for locking and releasing the pivotal and sliding connections of the bearing means and the body member at will.

15. In steering apparatus for motor vehicles, the combination with a steering shaft having an operating hand wheel thereon, of bearing means supporting said shaft for rotation, said bearing means including a split sleeve mounted on said shaft, said sleeve having a portion tapered in thickness, and means for releasably clamping said sleeve to said shaft to frictionally grip the latter against endwise displacement, said last named means including a manually slidable annular element surrounding said sleeve and displaceable longitudinally thereof along its tapered surface to effect clamping or release of said sleeve, and yielding means tending to displace said element in the direction toward the part of greater thickness of the sleeve to effect clamping of said sleeve on said shaft.

FRANK C. BEST.